US011540657B2

(12) United States Patent
Mormone et al.

(10) Patent No.: US 11,540,657 B2
(45) Date of Patent: Jan. 3, 2023

(54) PRESSURE COOKER

(71) Applicant: WMF Group GmbH, Geislingen/Steige (DE)

(72) Inventors: Maria Mormone, Kuchen (DE); Dieter Reinhard, Deggingen (DE)

(73) Assignee: WMF Group GmbH

( * ) Notice: Subject to any disclaimer, the term of this patent is extended or adjusted under 35 U.S.C. 154(b) by 720 days.

(21) Appl. No.: 16/479,323

(22) PCT Filed: Dec. 11, 2017

(86) PCT No.: PCT/EP2017/082130
§ 371 (c)(1),
(2) Date: Jul. 19, 2019

(87) PCT Pub. No.: WO2018/133993
PCT Pub. Date: Jul. 26, 2018

(65) Prior Publication Data
US 2019/0328168 A1 Oct. 31, 2019

(30) Foreign Application Priority Data
Jan. 20, 2017 (DE) ...................... 10 2017 200 906.3

(51) Int. Cl.
*A47J 27/08* (2006.01)
*A47J 27/09* (2006.01)

(52) U.S. Cl.
CPC ....... *A47J 27/0806* (2013.01); *A47J 27/0804* (2013.01); *A47J 27/0815* (2013.01); *A47J 27/09* (2013.01)

(58) Field of Classification Search
CPC ................ A47J 27/0804; A47J 27/0806; A47J 27/0808; A47J 27/0811; A47J 27/0813; A47J 27/0815; A47J 27/09
See application file for complete search history.

(56) References Cited

U.S. PATENT DOCUMENTS 4,899,782 A * 2/1990 Krejza .................... A47J 27/09
220/203.27
8,813,989 B2 8/2014 Hoffmann et al.
(Continued)

FOREIGN PATENT DOCUMENTS

CN 1650786 A 8/2005
CN 201658236 U 12/2010
(Continued)

OTHER PUBLICATIONS

International Search Report, issued in International Application No. PCT/EP2017/082130, dated Apr. 23, 2018, pp. 1-3, European Patent Office, Rijswijk, Netherlands.

*Primary Examiner* — Reginald Alexander
(74) *Attorney, Agent, or Firm* — Crowell & Moring

(57) ABSTRACT

Pressure cooker having a lid comprising a lid handle and a cooking vessel comprising a vessel handle, wherein the cooking vessel is closeable with the lid in a fluid-tight manner by means of a closure mechanism by the lid handle and the vessel handle being placed one above the other, wherein one of the two handles comprises a coupling group which has two coupling elements which can be mechanically coupled to, or uncoupled from, each other, and the other of the two handles comprises a coupling device constructed for said coupling together and/or said uncoupling in such a manner that, when the lid handle and the vessel handle are placed one above the other, the two coupling elements are either mechanically uncoupled from each other by means of the coupling device or mechanically coupled to each other.

16 Claims, 6 Drawing Sheets

(56) References Cited

U.S. PATENT DOCUMENTS

| | | |
|---|---|---|
| 2008/0290090 A1 | 11/2008 | Kindler et al. |
| 2012/0091146 A1 | 4/2012 | Hoffmann et al. |

FOREIGN PATENT DOCUMENTS

| | | | |
|---|---|---|---|
| CN | 201861418 U | 6/2011 | |
| CN | 102264262 A | 11/2011 | |
| CN | 103315620 A | 9/2013 | |
| CN | 103315620 B | 5/2015 | |
| CN | 104957972 A | 10/2015 | |
| DE | 43 15 245 A1 | 11/1994 | |
| DE | 10 2008 062 980 A1 | 7/2010 | |
| DE | 10 2009 013 240 A1 | 9/2010 | |
| EP | 1295551 A1 * | 3/2003 | ......... A47J 27/0806 |
| EP | 1 568 301 A1 | 8/2005 | |
| EP | 2 258 243 A1 | 12/2010 | |

* cited by examiner

PRESSURE COOKER

CROSS-REFERENCE TO RELATED APPLICATIONS

This application is a 371 nationalization of international patent application PCT/EP2017/082130 filed Dec. 11, 2017, which claims priority under 35 USC § 119 to German patent application 10 2017 200 906.3 filed Jan. 20, 2017. The entire contents of each of the above-identified applications are hereby incorporated by reference.

DETAILED DESCRIPTION

Figure 1:
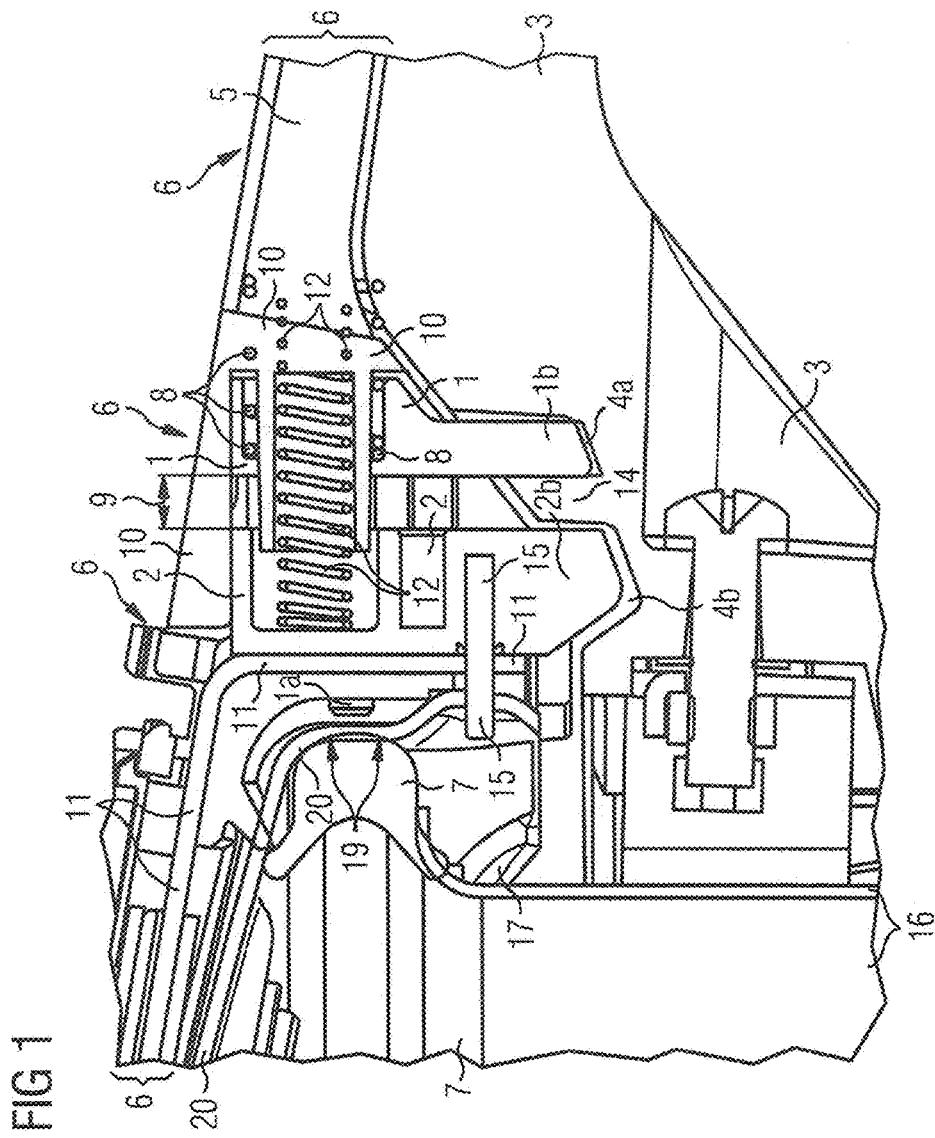
FIG. 1 shows a cutout from a sectioned view of a first embodiment.

The present invention relates to a pressure cooker. Such pressure cookers (according to the invention, this is generally understood to be a pressure cooking vessel) are known, for example, from DE 43 15 245 A1 or DE 10 2009 013 240 A1.

Based on the prior art, the objective is to provide an improved pressure cooker (pressure cooking vessel) which complies in the structurally simplest manner with all of the safety measures prescribed for pressure cookers and which, in addition, enables the easiest possible cleaning of extremely varied components or structural elements of the pressure cooker.

The present invention starts with the idea of preventing a pressure build-up (when the lid is placed incorrectly on the pan or the cooking vessel) by a lid seal (referred to below as a sealing element) being mechanically pressed away in an appropriate manner by means of an element in such a manner that, when the lid is incorrectly placed, a pressure build-up inside the cooker is prevented.

A pressure cooker according to the invention may comprise: a lid comprising a lid handle; and a cooking vessel comprising a vessel handle, wherein the cooking vessel is closeable with the lid in a fluid-tight manner by means of a closure mechanism by the lid handle and the vessel handle being placed one above the other, wherein one of the two handles comprises a coupling group which has two coupling elements configured to couple mechanically to each other and to uncouple mechanically from each other again, and wherein the other of the two handles comprises a coupling device which is constructed for said coupling together and/or for said uncoupling in such a manner that, when the lid handle and the vessel handle are placed one above the other, the two coupling elements are either mechanically uncoupled from each other by means of the coupling device or mechanically coupled to each other, wherein said fluid-tight closure of the cooking vessel with the lid is brought about by means of the closure mechanism.

It is preferable in this instance for the coupling device to be constructed both for coupling together and for uncoupling.

The lid handle and the vessel handle may be rotatable or pivotable relative to each other about the pressure cooker center axis (which is also referred to below for short as a pot center axis). Generally (when the pressure cooker is closed correctly), the pot center axis corresponds to the cooking vessel center axis and the lid center axis. These axes can be considered to be axes of rotational symmetry of the generally (approximately, that is to say, inter alia with the exception of the handle thereof) rotationally symmetrical lid and the generally (approximately, that is to say, inter alia with the exception of the handle) rotationally symmetrical cooking vessel. The axes mentioned above generally coincide so that when an "axis" is mentioned below, this is always intended to refer to this axis of symmetry or the pot, vessel or lid center axis, unless stated otherwise.

When the two handles (lid handle and vessel handle) are one above the other and have been correctly closed by means of the/their closure mechanism, the fluid-tightness or pressure-tightness of the pressure cooker is produced, said pot is thus closed in a fluid-tight or pressure-tight manner. Generally, the two handles being one above the other is intended to mean an alignment one above the other, that is to say, in plan view (viewed along the axis) a substantially congruent alignment one above the other of the two handles which protrude relative to the actual lid member or the actual cooking vessel member. If the two handles are pivoted or turned out of their aligned or congruent position one above the other (that is to say, turned or pivoted out of this position with respect to each other about the axis), the pot is opened and the cooked item inside the pot is accessible.

The closure mechanism is or preferably comprises a mechanical closure. In this, the (correct) pressure-tight closure of the pot is preferably carried out by placing the lid handle and the pot handle one above the other as follows. The lid, on the one hand, and the cooking vessel, on the other hand (starting from a position in which both handles are not yet one above the other), are inserted into each other along the axis and pushed into each other. Afterward, the lid can be rotated relative to the cooking vessel (or vice versa; the decisive aspect is the opposing rotation or pivoting of the cover and the cooking vessel relative to each other) about the axis and in the closure direction in such a manner that the two handles are moved into the position placed one above the other.

By rotating in the opposing direction (that is to say, counter to the above-described closure direction), that is to say, by moving the two handles into a position not placed one above the other, the lid and the cooking vessel can also be separated from each other again by pulling apart along the axis (opening of the pressure cooker).

The closure mechanism may in particular be a bayonet closure (or comprise one). In this instance, the pressure-tightness can be produced by means of a sealing element (for example, a circumferential sealing ring) of the closure mechanism. The closure mechanism may thus comprise a plug/rotation connection, for example, in the form of a bayonet closure, and a sealing ring.

Preferably, the lid handle has the coupling group and the vessel handle has the coupling device. The term "have" in this instance may in particular be understood to mean integrate. The roles may, however, also be reversed (the lid handle then has the coupling device and the vessel handle the coupling group).

According to the invention the first variant described is preferred, that is to say, when the two handles are placed one above the other, the two coupling elements of the coupling group can be mechanically uncoupled from each other by means of the coupling device. This may, for example, (see below) be implemented by means of a forking control cam having a mechanical separation element (in particular: wedge) between the two forks or control cam branches.

Features, which can advantageously be implemented, can include, wherein for mechanically uncoupling from each other or for mechanically coupling to each other, the two coupling elements when viewed relative to each other can be moved by means of the coupling device along a straight line.

The uncoupling movement and the coupling movement (of the two coupling elements relative to each other), linear movements or translation movements along said straight line are thus preferred.

Other features that can advantageously be implemented can include wherein the coupling group comprises as a first coupling element a bolt element and as a second coupling element a sliding element, wherein the two coupling elements can be moved relative to each other by means of the coupling device.

The features described herein can be implemented with each other in any combinations. In the following embodiments, consequently, only particularly advantageous feature combinations are described; individual features from dependent claims may in particular also be omitted.

Other features that can advantageously be implemented can include wherein the handle which has the coupling group has at least one housing element, preferably two housing elements, by means of which, preferably between which, the two coupling elements are supported or can be supported in a mechanically tensioned manner with respect to each other, preferably are supported or can be supported in a pretensioned manner with respect to each other by means of a pressure spring, preferably are supported or can be supported in a pretensioned manner with respect to each other by means of two pressure springs.

The pressure spring may be tensioned between one of the housing elements and one of the coupling elements (preferably: the first coupling element, see below). However, it can also be fixed with one of the spring ends thereof to one of the coupling elements (preferably: to the first coupling element) and/or with one of the spring ends thereof (in the "and" case: with the other spring end thereof) to one of the housing elements. The spring may be supported inside the housing element(s) on the or one of the housing element(s), on the one hand, and on one of the coupling elements (preferably: on the first coupling element), on the other hand. Preferably, the support is carried out on wall portions of one of the housing elements, on the one hand, and one of the coupling elements, on the other hand. As a result of all of what is described above, the pretensioned support can be brought about.

In some examples, the two coupling elements can thus, when uncoupled, move apart in a linear manner (that is to say, in the form of a translation movement or along a/the straight line) and, when coupled to each other again, can move together again. This is brought about by them being mechanically uncoupled or coupled to each other again by the coupling device.

Other features which can advantageously be implemented can include wherein said mechanical mutual uncoupling or mutual coupling of the two coupling elements by means of the coupling device when the lid handle and the vessel handle are placed one above the other brings about an application of a sealing element of the closure mechanism on the lid, whereby in turn said fluid-tight closure of the cooking vessel with the lid is brought about by means of the closure mechanism.

If the uncoupling brings about said application of the sealing element, the first embodiment described in greater detail below is produced. If, in contrast, the coupling of the two coupling elements brings about such an application of the sealing element, a variant according to the invention (also described below in greater detail as the second embodiment) is produced.

Generally, the sealing element is thus positioned prior to the two handles being placed one above the other at least partially with spacing with respect to the lid. In particular, the sealing element may be at least partially spaced apart from the inner side of the edge of the lid. During application (this is generally intended to be understood to be bringing into contact) of the sealing element on the lid, this spacing is at least reduced, generally reduced to zero (that is to say, eliminated). There is thereby said fluid-tight closure between the lid, on the one hand, and the cooking vessel, on the other hand. The sealing element is preferably a sealing ring which extends along the lid edge (and preferably at the inner side or inside thereof) and/or preferably a completely circumferential sealing ring. In this instance, the "and" variant of the above sentence is preferred.

Other features that can advantageously be implemented can include wherein one of the two coupling elements of the coupling group comprises a spacer which during mechanical uncoupling or mutual coupling is moved relative to the lid, in particular when viewed from the lid center axis away from the axis in such a manner that said application of the sealing element on the lid is carried out. Alternatively or in addition, other features can include wherein one of the two coupling elements of the coupling group has an abutment, wherein in the coupled-together state of the two coupling elements the abutment is mechanically supported on the other of the two coupling elements, preferably on a counter-bearing of this other coupling element. Alternatively or in addition, other features can include wherein the same one of the two coupling elements has both the spacer and the abutment, wherein the spacer at least in the coupled-together state of the two coupling elements, where applicable also in the mutually uncoupled state of the two coupling elements, at the side opposite the abutment protrudes beyond the other of the two coupling elements, preferably beyond the counter-bearing thereof.

In some examples, the overhang (that is to say, the protrusion) can preferably be constructed or orientated along the mentioned straight line or linear movement direction, along which the two coupling elements can be moved relative to each other by means of the coupling device. The overhang or the protrusion thus represents a protuberance.

The spacer and the abutment are preferably secured to each other, in a particularly preferred manner, both form together in one piece one of the coupling elements or the first coupling element. Therefore, the latter preferably comprises exclusively these two components spacer and abutment and has no other components. The spacer and the abutment, when viewed along the straight line already mentioned, are preferably positioned spaced apart from each other.

The mechanical support generally means a (mechanical) contact, that is to say, a direct abutment of the coupling element with the abutment (or of the abutment) and the other coupling element (or the counter-bearing thereof).

When the abutment is in abutment with the counter-bearing (or the coupling element, which this counter-bearing comprises), therefore, when the coupled-together state exists, the spacer consequently generally extends when viewed relative to the coupling element with the counter-bearing beyond the latter coupling element to the maximum extent. (The spacer is located, starting from the abutment and along the straight line already mentioned, that is to say, when viewed in the linear movement direction, at the side opposite the counter-bearing or on the coupling element which comprises this counter-bearing.) If the two coupling elements are in the uncoupled state, the abutment, when viewed in the linear movement direction, is generally spaced apart to the maximum extent from the counter-bearing thereof (or from the coupling element, preferably the second coupling element, which comprises this counter-bearing). At the side of the counter-bearing opposite the abutment (or the coupling element thereof) in this instance, again when viewed in the linear movement direction, the spacer is retracted to the maximum extent relative to the counter-bearing or to the coupling element thereof (this position corresponds to the position of the spacer or the outer end thereof facing away from the counter-bearing nearest the counter-bearing, when viewed in the direction of said straight line or translation movement direction).

Other features that can advantageously be implemented can include wherein the spacer is an elongate member, in particular formed as an elongate bolt, projection, rod or mandrel, preferably is a cylindrical elongate bolt and/or preferably an elongate bolt having a length to diameter ratio of ≥3, preferably ≥5.

Other features that can advantageously be implemented can include wherein the coupling device has a partition element and two control cam branches which are separated from each other by the partition element in such a manner that, when the lid handle and the vessel handle are placed one above the other, the two coupling elements are mechanically uncoupled from each other by the partition element and separately from each other guided mechanically into the two control cam branches.

In this instance, the partition element may be a wall element which tapers toward one side (that is to say, in the rotation or pivot direction in order to open the lid), in particular a wedge. The two control cam branches may be guide recesses (for example, notches, grooves or the like) which extend at both sides of the partition element (that is to say, separated from each other). In the direction toward the tapering, the two control cam branches (after, when viewed in this direction, the partition element terminates) combine to form a single guide recess. This guide recess then forms a common control cam portion for the two coupling elements.

In this common control cam portion, the two coupling elements can be moved together in the coupled-together state (that is to say, when the two handles are rotated or pivoted to a sufficient extent with respect to each other). In other words: in the open state of the lid and the cooking vessel, that is to say, when the two handles are not yet located one above the other, but instead in the rotation or pivot direction are still sufficiently spaced apart from each other, the two coupling elements first run together in the common control cam portion of the control cam and subsequently together therein before this common portion (when viewed in the closure direction of the lid and cooking vessel) splits or forks as a result of the partition element into the two control cam branches. In these two branches, the two coupling elements (brought about by the partition element which widens when viewed in the closure direction) receive a larger spacing—when viewed in a radial direction toward the outer side or in the translation movement direction of the two coupling elements—from each other, the more the lid, on the one hand, and the cooking vessel, on the other hand, approach the state thereof closed in a fluid-tight manner or the closer the lid handle, on the one hand, and the pot handle, on the other hand, move toward their position located one above the other.

Preferably, on the one hand, the partition element, the common control cam portion and the two separated control cam branches are constructed in the vessel handle, whereas, on the other hand, the two coupling elements are constructed in the lid handle. In this instance (when viewed in the direction of the pot center axis), the two coupling elements protrude over the lower side of the lid handle facing the vessel handle and extend into the guiding cams (common control cam portion and both separated control cam branches) formed in the upper side (facing the lid handle) of the vessel handle.

In the variant according to the invention (cf. also the following second embodiment), the coupling device has two side walls which taper toward each other and a single control cam which is located therebetween and which tapers as a result of the tapering. This control cam is thus initially wider, before it increasingly tapers as a result of said tapering of the side walls as a guide recess. This common guide recess is constructed in one of the handles (preferably: in the vessel handle). In the complementary handle (preferably: in the lid handle), the two coupling elements are again positioned so as to be able to be moved relative to each other (preferably as in the first embodiment, see below, movable along a straight line).

In this variant (second embodiment), when the two handles are placed one above the other, the two coupling elements of the coupling group are mechanically coupled to each other by means of the coupling device by the two side walls pressing the two coupling elements together when the two handles are pivoted together into the closure position of the lid and cooking vessel or into the position thereof placed one above the other. In this instance, in a quite similar manner to the first embodiment, a retraction of a spacer of one of the two coupling elements (preferably: first coupling element) may thereby occur so that a sealing element is applied to the lid. The mechanical coupling of the two coupling elements by means of the coupling device may in a similar manner to the first embodiment be carried out by means of a pretensioned pressure spring (which otherwise, that is to say, in the uncoupled state, keeps the two coupling elements spaced apart from each other, for example, by means of two housing elements, in a quite similar manner to the first embodiment).

Other features that can advantageously be implemented can include wherein the lid handle is removably secured to the lid.

Features that can advantageously be implemented can include wherein the lid handle comprises the coupling group and in that the second coupling element thereof is constructed in such a manner that, when viewed from the lid center axis, it can be moved away from the axis with the first coupling element of the coupling group being carried mechanically in order to enable the lid handle to be removed from the lid.

In such an example, the second coupling element (when viewed relative to the pot center axis) may be able to be retracted, that is to say, pushed when viewed from the pot center axis in the direction of the lid or pot outer side (that is to say, can be pushed radially outward).

During this retraction or pushing outward, the first coupling element is preferably carried by the/a counter-bearing of the second coupling element being mechanically coupled to the/an abutment of the first coupling element. For example, this may be carried out by a mechanical stop of the counter-bearing against the abutment (whilst the second coupling is moved radially outward), whereby, after successful coupling of the counter-bearing and the abutment, the abutment (and consequently the first coupling element) is also pushed outward.

If (see above) the lid handle has the at least one housing element or the two housing elements (by means of which the two coupling elements can be supported in a mechanically tensioned manner with respect to each other), the outward movement away from the pot center axis generally corresponds to an outward movement relative to the housing element(s).

According to the invention, an elongate bolt can consequently be coupled to a second coupling element (locking unit) and a movement control which is connected thereto can be produced via a forking control cam, for example, in the pot handle. Said locking unit and the pot handle thereby obtain a dual function. Firstly, the function of locking the lid handle to the lid during operation and additionally, by retracting the bolt, moving the sealing ring into its sealing position. In the reverse case (that is to say, when the pot is opened), when the lid handle is pivoted out of the pot handle—by relieving the bolt via the control cam on the pot handle—the pin is moved into its starting position again. This can be implemented by means of a pressure spring. In this instance, the bolt presses the sealing ring away from its sealing face again so that no more pressure can be built up.

Via a coupling of the lock, when the handle is placed onto and removed from the lid, the bolt is retracted so that there is no collision during this operation and a secure handling is produced.

The present invention thus offers an alternative solution to the prior art which implements in particular the advantages described in the object of the present invention. In particular the removal of the lid handle from the lid is possible using the (second) coupling element or the counter-bearing thereof: the spacer or the bolt can thus be retracted so that this bolt can be removed from its hole (formed in the lid). Without a (second) coupling element constructed in this manner, the lid handle would not be able to be removed from the lid itself.

The invention is described below with reference to two embodiments. In the drawings:

FIGS. 1 to 5 show the first embodiment, and

Figure 6:
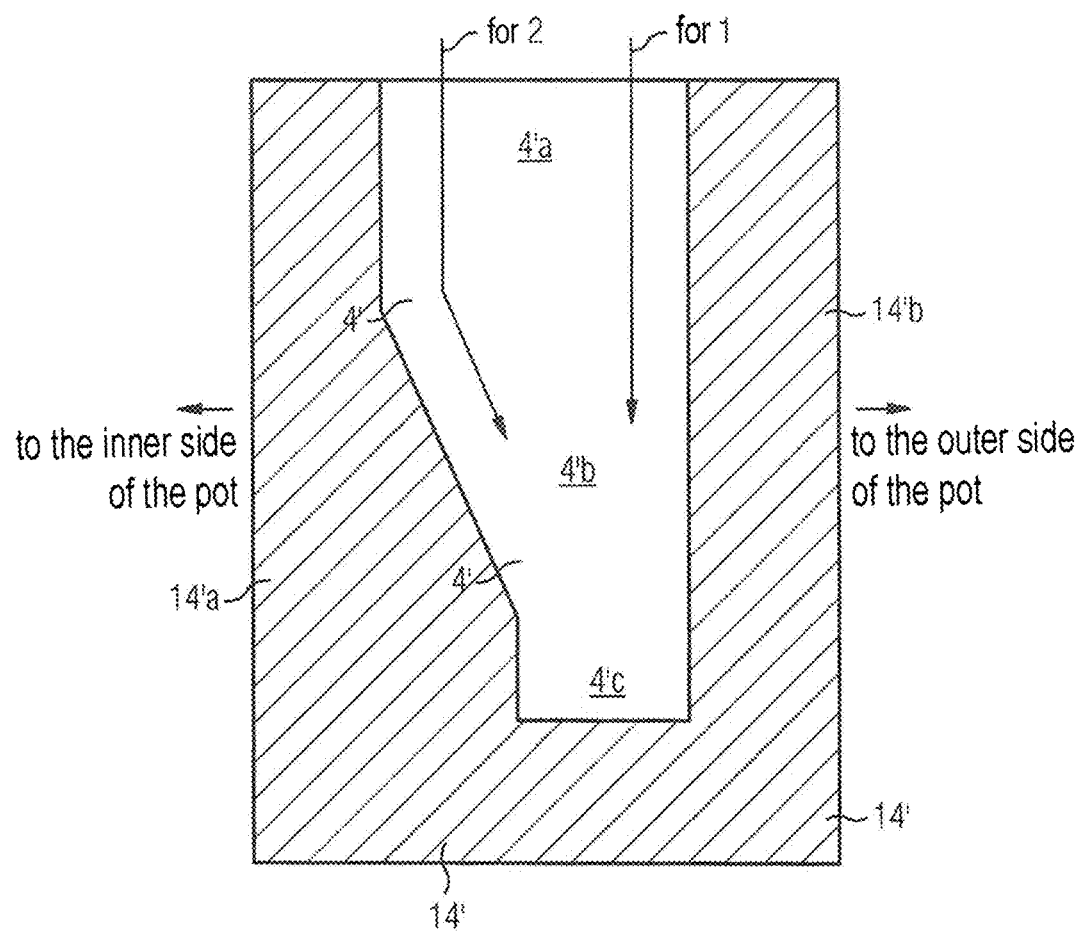
FIG. 6 shows a second embodiment.

FIG. 6 shows the second embodiment (wherein said second embodiment or the second variant is constructed with the exception of the differences described in relation to FIG. 6 in a quite similar manner to the first embodiment).

FIG. 1 shows a cutout from a sectioned view which illustrates a plane parallel with the pot longitudinal axis or the pot axis of symmetry (which is the axis of symmetry of both the lid and the cooking vessel) of a pressure cooker. FIGS. 2 to 5 show three-dimensional views (FIGS. 2, 3B, 4 and 5) or another sectioned view (FIG. 3A) or individual structural elements of the pressure cooker shown in FIG. 1.

The inner side of the lid 6 (which in the closed state of the pot faces the item to be cooked) is formed by means of a molded component (internal molded component 20) and in the same manner as the lid 6 itself illustrated only as a cutout. The lid handle 5 extends from the actual lid 6, which is formed in an approximately rotationally symmetrical and approximately flat-cylindrical manner, from the lid or pot axis of symmetry (not visible) in a radially protruding manner, that is to say, in a manner directed radially outward. As described below, this lid handle can be removably secured to the molded component 20. The elements 5 and 20 together are selectively referred to below as the lid 6 or only the actual molded component 20 without the handle 5, wherein the person skilled in the art knows or can identify from the context what is intended to be meant.

The inner molded component 20 of the lid 6 is formed at the lower end thereof facing the cooking vessel 16 as a component of a closure mechanism 7 (seal), 17 (bayonet closure portion), wherein the component 17 of the closure mechanism (cf. also FIG. 4) forms the lid-side portions of a bayonet closure. The upper edge of the (approximately cylindrical) cooking vessel 16 which complements the lid forms the complementary components of the bayonet closure so that the lid 6 with the lid handle 5 which is releasably or removably secured thereto can be connected by means of the bayonet closure of the closure mechanism in a fluid-tight, vapor-tight (that is to say, fluid-tight) and pressure-tight manner to the cooking vessel 16 (closed state of the pressure cooker, see also following description). Said closure mechanism 7, 17 further includes the peripheral sealing ring 7 which is in abutment at the inner side with the outer edge of the lid 6, that is to say, at the inner side against the molded component 20. In the pressure-tight closed state (closure mechanism or bayonet closure thereof closed with the handles 3, 5 located one above the other: see below), the outer side of the sealing ring 7 is consequently in abutment over the entire lid periphery with the inner side 19 of the internal molded component 20 facing the lid center and consequently seals the inner side of the pot in a pressure-tight manner from the outer space.

Figure 2:
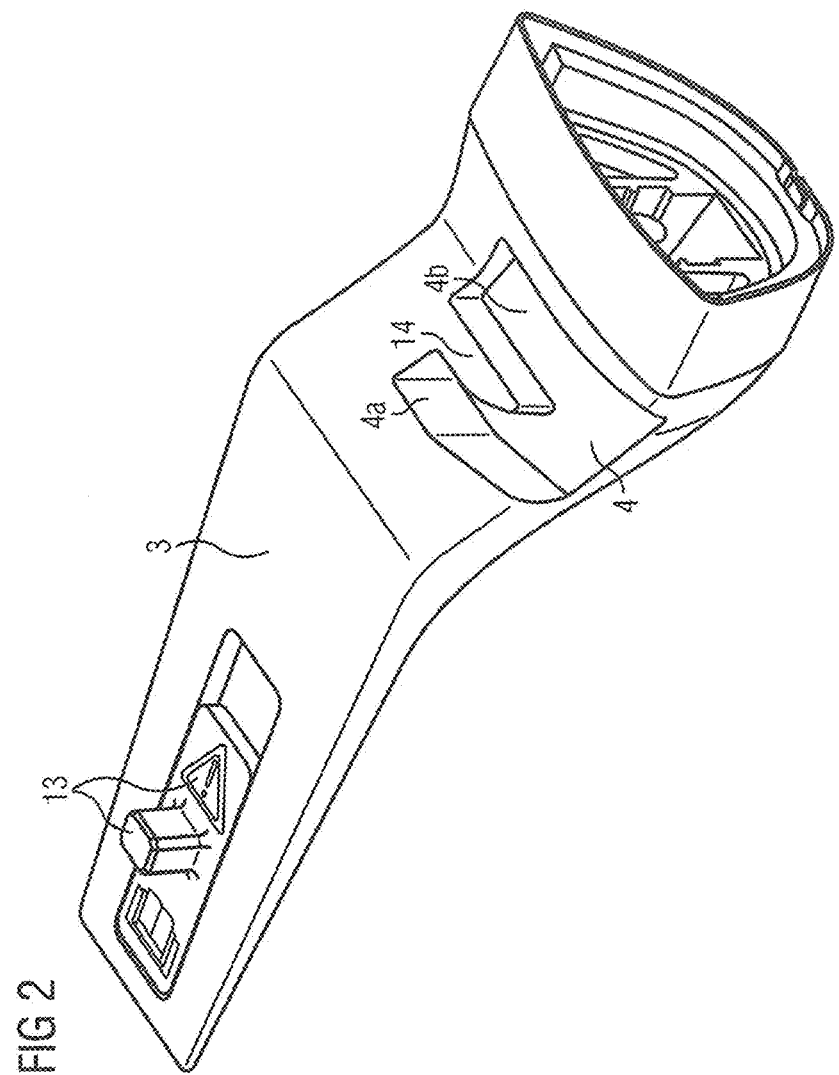
FIG. 2 shows a perspective view of the first embodiment.

In a complementary manner to the lid handle 5 of the lid 6, a vessel handle 3 is secured to the cooking vessel 16 (cf. also FIG. 2). With correct, pressure-tight closure of the pot, the two handles 5 and 3 (viewed along the pot center axis or pot axis of symmetry not shown in this instance) are placed in alignment one above the other after the lid 6 and the cooking vessel 16 or the respective bayonet closure components thereof have been previously assembled with the handles 5 and 3 rotated with respect to each other along the pot center axis. As described below, according to the invention, when the two handles 5, 3 are moved into their position placed one above the other by rotating these two handles with respect to each other, the bolt 1a is retracted, whereby the sealing ring 7 which previously protruded partially from the inner side 19 of the molded component 20, that is to say, at the height of said bolt 1a and because of it, is applied along the entire inner periphery of the lid 6 against said inner side 19. The lid 6 and cooking vessel 16 are thereby locked with each other in a fluid-tight manner when the bayonet closure or the closure mechanism is closed.

When the two handles 5 and 3 are placed one above the other in order to close the pressure cooker in a pressure-tight and fluid-tight manner, the bolt 1a is retracted in order to apply the sealing element 7 to the inner side 19 of the molded component 20 by means of a first coupling element 1 and a second coupling element 2 which together form a coupling group 1-2. These two coupling elements 1, 2 are mechanically uncoupled from each other, that is to say, moved to a spacing 9 from each other, whereby said retraction of the bolt 1a occurs. The pot is also opened again when the two handles 3, 5 are rotated with respect to each other (that is to say, when the two handles 5, 3 are removed from their position placed one above the other) by means of these two coupling elements 1, 2: if the handle 5 is rotated relative to the handle 3 about the pot center axis, the two elements 1, 2 are mechanically coupled to each other again (the spacing 9 is thus zero). The bolt 1*a* is thereby pushed forward in the direction toward the pot center axis: the bolt 1*a* is pushed through a hole which is formed and positioned in a manner adapted thereto (not visible in the section of FIG. 1) into the molded component 20 through the molded component, whereby a portion of the sealing ring 7 is pressed away from the inner side 19 of the molded component 20 (that is to say, in the direction toward the center axis). Between this inner side 19 or the molded component 20, on the one hand, and the sealing ring 7, on the other hand, an air gap is thus produced, the fluid-tightness of the closure between the lid 6 and cooking vessel 16 is consequently canceled and the lid 6 can be removed from the cooking vessel 16.

In order to implement said operating method, the lid 6 or the handle 5 thereof has two housing elements 10, 11 which together form a rigid housing which is formed in the lid handle 5 and which partially (that is to say—radially from the pot center axis when viewed downward—at both sides and in an upward direction but not in a downward direction) surrounds the two coupling elements 1, 2. The inner housing element 11 is in this instance, when viewed from the pot lid center axis in a radially outward direction, that is to say, when viewed in the orientation direction of the handle 5, positioned between the molded component 20, on the one hand, and the second coupling element 2 (in this instance, constructed as a sliding element) acts as a counter-bearing or support of the sliding element 2 and is constructed in the region of the support of this sliding element 2 as a substantially planar molded component.

On the housing element 11, another externally positioned housing element 10 is fixed (for example, securely screwed) and extends above the two coupling elements 1, 2 initially radially outward, before it bends downward in the direction toward the external lid handle end beyond the two coupling elements 1, 2 and forms a counter-bearing or a support for the first coupling element 1 which is constructed in this instance as a bolt element. When viewed in a radially outward direction, the clear internal width between the internal housing element 11, on the one hand, and the external housing element 10, on the other hand (see in this regard also the spacing 9 in FIG. 1), leaves space for a linear translation movement of the two coupling elements 1, 2 relative to each other along the handle 5 or radially outward when viewed from the pot center axis. As a result of this translation movement of the two elements 1, 2 relative to each other within the two housing elements 10, 11, the two elements 1, 2 can consequently be moved from the state mechanically uncoupled from each other (with a spacing 9), as shown in FIG. 1, to the state mechanically coupled to each other (that is to say, without any spacing 9, see in this regard also FIGS. 3A and 3B) and vice versa. This movement is carried out using the coupling device which is constructed in the vessel handle 3 so as to complement the coupling group 1-2.

This coupling device comprises a control cam 4, 4*a*, 4*b* which is introduced as a recess in the upper side of the vessel handle 3 (that is to say, in the side of this handle 3 which faces the handle 5 or the lower side thereof). The cam comprises when viewed from the edge of the handle 3 toward the center thereof (cf. FIG. 2) initially a control cam portion 4 which begins at the edge side, and which is common when viewed with respect to the two elements 1, 2 in the coupled-together form and which splits toward the center of the handle into two separate control cam branches 4*a*, 4*b*. The two separate control cam branches 4*a*, 4*b* (as recesses which are introduced in the upper side of the handle 3 and which extend transversely when viewed with respect to the longitudinal axis of the handle) are separated from each other when viewed in the longitudinal direction of the handle 3 by a partition element 14 in the form of a wedge. When viewed radially from the pot lid center axis in an outward direction (that is to say, when viewed in the longitudinal direction of the handle), there consequently follows approximately in the center of the handle 3 in the upper side thereof initially a control cam branch 4*b*, then the wedge 14 and finally another control cam branch 4*a*.

The lower ends 1*b*, 2*b* of the coupling elements 1, 2 which rest movably in the housing elements 10, 11 of the upper handle 5 are constructed and positioned so as to complement the coupling device 4, 4*a*, 4*b*, 14. The lower end of the first coupling element 1 facing the handle 3 protrudes as an abutment 1*b* also over the lower side of the handle 5, in the same manner as the lower end of the second coupling element 2 formed as a counter-bearing 2*b*. The two lower ends of the elements 1, 2 or the abutment 1*b* and the counter-bearing 2*b* are formed and positioned in such a manner that in the mechanically coupled-together state of the two elements 1, 2 they can be positioned in a positive-locking manner in the common control cam portion 4 and in the state mechanically uncoupled from each other (that is to say, when the spacing 9 as shown in FIG. 1 is present) can be positioned separated from each other in a positive-locking manner in the two separate control cam branches 4*a*, 4*b*.

That is to say: if the two handles 3, 5 are not positioned one above the other, the two elements 1, 2 or the lower ends 1*b*, 2*b* thereof (as a result of the pressure spring 8 which ensures between the two elements 10, 1 a tensioning of the two elements 1, 2 with respect to each other, cf. below) are located inside the housing elements 10, 11 in the handle 5 in the form mechanically coupled to each other. If the handle 5 is turned (after correct insertion of the lid 6, on the one hand, and the cooking vessel 16, on the other hand, one inside the other along the pot center axis) about the center axis in the direction toward the vessel handle 3, the two handles 3, 5 are moved one above the other, the two bearings 1*b*, 2*b* first run initially in a state coupled to each other as a result of their protrusion from the lower side of the handle 5 in a positive-locking manner into the common control cam portion 4. If the handle 5 is turned further in said direction, the two ends 1*b*, 2*b* meet in the form initially still coupled to each other the pointed end of the wedge 14, by which they (counter to the resilient force of the spring 8) when the handles 3, 5 are further rotated are pressed mechanically apart. The counter-bearing 2*b* consequently slides separately from the abutment 1*b* into the second control cam branch 4*b* and the abutment 1*b* slides into the first control cam branch 4*a*. If the two handles 3, 5 are finally in alignment, that is to say, placed completely one above the other, the position of the coupling group 1-2 shown in FIG. 1 is present: the first and the second coupling elements 1, 2 are spaced apart from each other to the maximum extent 9. There is therefore an overcompensation of the force of the spring 8 which presses the two elements 1, 2 toward each other as a result of the mechanical separation using the wedge 14. The second coupling element 2 strikes (at least approximately) the inner housing element 11 and the first coupling element 1 strikes (at least approximately) the outer portion of the outer housing element 10.

The two elements 1, 2 are inserted one in the other as follows: the (inner) side of the element 1 facing the pot center axis, that is to say, the end of the element 1 facing the pot center axis is constructed as an elongate bolt or spacer 1*a* which protrudes over the (inner) side of the element 2 facing the pot center axis, that is to say, over the end of the element 2 facing the pot center axis and is guided through a hole in the housing element 11 toward the inner side, that is to say, in the direction toward the molded component 20 (through the hole in the molded component 20) toward the sealing ring 7. In the position of the handles 3, 5 placed one above the other (since the abutment 1*b* is completely introduced into the control cam branch 4*a*), the bolt 1*a* is in a state retracted to the maximum extent relative to the sealing ring 7: the inner end of the bolt 1*a* (when viewed in the radial direction from the pot center axis outward) is in this position positioned between the molded component 20, on the one hand, and the housing element 11, on the other hand, that is to say, retracted from the hole in the molded component 20 which enables the bolt 1*a* to be pushed through this molded component 20 and consequently enables the sealing ring 7 to be pressed in the direction toward the pot center axis.

If (in order to open the pot) the handle 5 is turned relative to the handle 3 out of the position in which the two handles 3, 5 are one above the other again, the two elements 1, 2 or the lower ends 1*b*, 2*b* thereof after leaving the wedge portion 14 (when viewed in the peripheral direction of the pot) are mechanically coupled to each other again by the force of the pressure spring 8. Since the internal wall both of the second control cam branch 4*b* and of the common control cam portion 4 is approximately constantly spaced from the pot center axis, the element 2 remains in this instance with the inner side thereof in a position in abutment with the housing element 11, whilst the first coupling element 1 (as a result of the resilient force of the pressure spring 8 and the inwardly running transition of the first control cam branch 4*a* into the common control cam portion 4) moves in the direction toward the second coupling element 2 (reduction of the spacing 9 to zero or mechanical stop of the two bearings 1*b* and 2*b*, see in this regard also FIG. 3A and FIG. 3B). The bolt 1*a* is thereby pushed through the hole in the molded component 20 in the direction toward the pot center axis and presses the sealing ring 7 locally away from the inner side 19 of the molded component 20. An air gap is produced, the pressure-tightness is canceled and the pressure cooker can consequently be opened.

Figure 3:
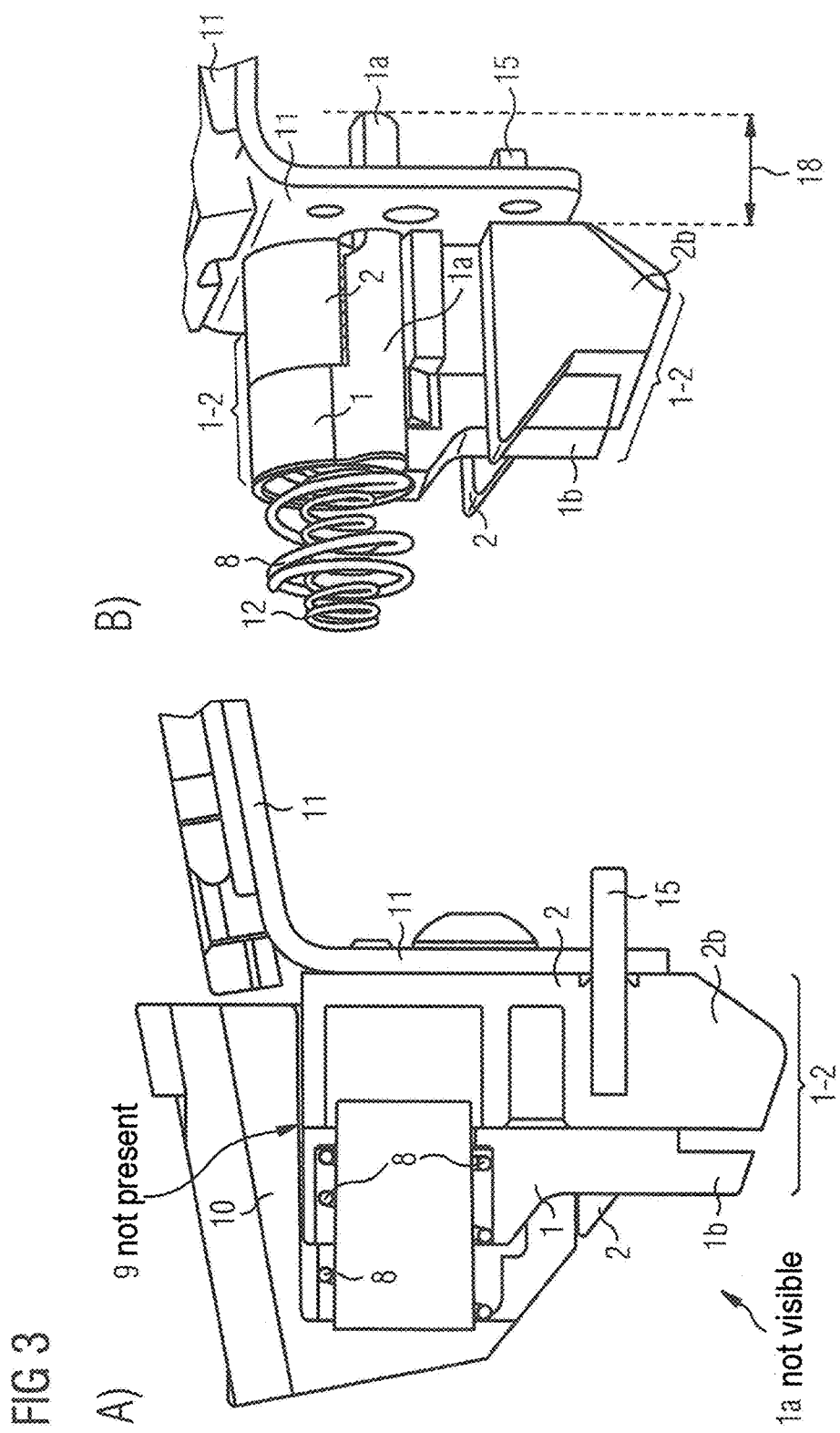
FIG. 3A shows a side view of the first embodiment (without the remaining handle elements or pot elements) in a state in which the two coupling elements, a bolt element and a sliding element are mechanically coupled to each other.
FIG. 3B shows a perspective view of the first embodiment (without the remaining handle elements or pot elements) in a state in which the two coupling elements, a bolt element and a sliding element are mechanically coupled to each other.

FIGS. 3A and 3B show (without the remaining handle elements or pot elements) this state in which the two coupling elements, bolt element 1 and sliding element 2, of the coupling group 1-2 are mechanically coupled to each other, the bolt 1*a* of the bolt element 1 consequently protrudes to the maximum extent with respect to the pot center axis. As shown in FIG. 3, the pressure spring 8 is internally supported on the outer end thereof on the outer portion of the housing element 10 and is with the inner end thereof inserted into the upper portion of the bolt element 1 (in the translation direction or the linear movement direction of the two elements 1, 2 relative to each other within the two housing elements 11, 10) in such a manner that the resilient force of the spring 8 presses the bolt element 1 in the direction toward the sliding element 2: mechanical stop of the element 1 on the outer side when viewed radially from the pot center axis toward the outer side (that is to say, at the side facing away from the pot center axis) of the element 2, also brought about by the resilient force of the spring 8, mechanical stop of the inner side (that is to say, the side facing the pot center axis) of the element 2 on the outer face (that is to say, at the face facing away from the pot center axis) of the housing element 11.

The maximum overhang of the bolt 1*a* shown in FIG. 3B over the inner side (when viewed in the direction of the pot center axis) of the element 2, by means of which the pressing away of the sealing ring 7 in an inward direction is brought about, is given the reference numeral 18.

FIGS. 1 to 5 additionally show (reference numeral 15) how, in the first embodiment, a removal of the lid handle 5 from the molded component 20 of the lid 6 is enabled.

When viewed along the pot center axis or from the top in a downward direction (that is to say, in the direction toward the handle 3), the second coupling element 2 has between the upper end thereof (at the height of the spring 8) and the lower counter-bearing 2*b* thereof an inward (that is to say, directed toward the pot center axis) projection 15. This projection 15 is when viewed radially inward (or in the translation movement direction of the two elements 1, 2 relative to each other) extended to such an extent or projects to such an extent over the inner side of the counter-bearing 2*b* that (at least when the coupling element 2 is in abutment with the housing element 11, cf. FIG. 1)—extending through an opening in the inner housing element 11 which is constructed in a positive-locking manner with respect to the projection 15 and through an opening which is formed in a positive-locking manner with respect to the projection 15 in the inner molded component 20—it protrudes inward both over the element 11 and over the element 20. See in this regard in particular FIGS. 1 and 4.

The projection 15 is fixed to the element 2 or a component thereof. The element 2 (and consequently the projection 15) is mechanically connected to the counter-bearing 2*b* (FIGS. 1 and 3). If the element 2 on the counter-bearing 2*b* is pulled away from the pot center axis, that is to say, radially outward (not shown), this mechanical connection brings about a retraction of the second coupling element 2 (and consequently of the projection 15) in a radially outward direction (counter to the resilient force of the spring 8 and, cf. below, the spring 12): between the housing element 11 and the sliding element 2 a gap is consequently produced (not shown in the Figures), the projection 15 or the inner end thereof is retracted behind the molded component 20 into the intermediate space between the component 20 and the housing element 11, the outer side of the sliding element 2 couples in this instance mechanically to the bolt element 1, also pushes it (counter to the resilient force of the spring 8) in a radially outward direction and thereby brings about at the same time a retraction of the bolt 1*a* into the intermediate space between the molded component 20 and the housing element 11.

Both elements 1*a* and 15 are consequently retracted into the intermediate space between the molded component 20 and the housing element 11. The elements 1*a*, 15 consequently in each case release the openings or holes which are introduced for them 1*a*, 15 in the molded component 20 and consequently enable by actuating the counter-bearing 2*b* a removal of the lid handle 5 from the molded component 20 of the lid 6. (A sliding member 13 serves to secure against opening of the lid under pressure.)

This has the advantage that the molded component 20, on the one hand, and the lid handle 5 (with the components 1, 2, 8, 10, 11 and 12) thereof, on the other hand, can be cleaned separately from each other. During the period of operation, it is not possible to prevent (slight) occurrences of contamination also occurring between the molded component 20 and the lid handle 5.

The component 12 inside the housing elements 10, 11 of the lid handle 5 is also a pressure spring which is positioned concentrically inside the pressure spring 8. This spring 12 has a locking and an unlocking function as follows.

The side of the substantially vertically extending portion of the housing element 10 facing the pot center axis forms a common abutment face for the two springs 8 and 12. Between the substantially vertically extending portions of the housing elements 10 and 11, the spring 8 is tensioned between the elements 10 and 1. Concentrically inside the spring 8, the spring 12 is tensioned between the elements 10 and 2. The spring 12 is capable of pressing the sliding element 2 in the direction toward the pot center axis (wherein the sliding element 2 strikes the housing element 11). The spring 8 is capable of pressing the bolt element 1 in the direction toward the pot center axis (wherein the bolt element 1 strikes the sliding element 2). Also providing the spring 12 thus has the following particular advantage: if this spring 12 were not present, although the above described basic functions of the first embodiment would be ensured, in the fully retracted state (that is to say, in the position furthest away from the pot center axis) of the bolt element 1, the sliding element 2 between the housing element 11, on the one hand, and the abutment 1b, on the other hand, would (in an undesirable manner) be able to be moved completely freely, that is to say, without any tensioning.

Figure 4:
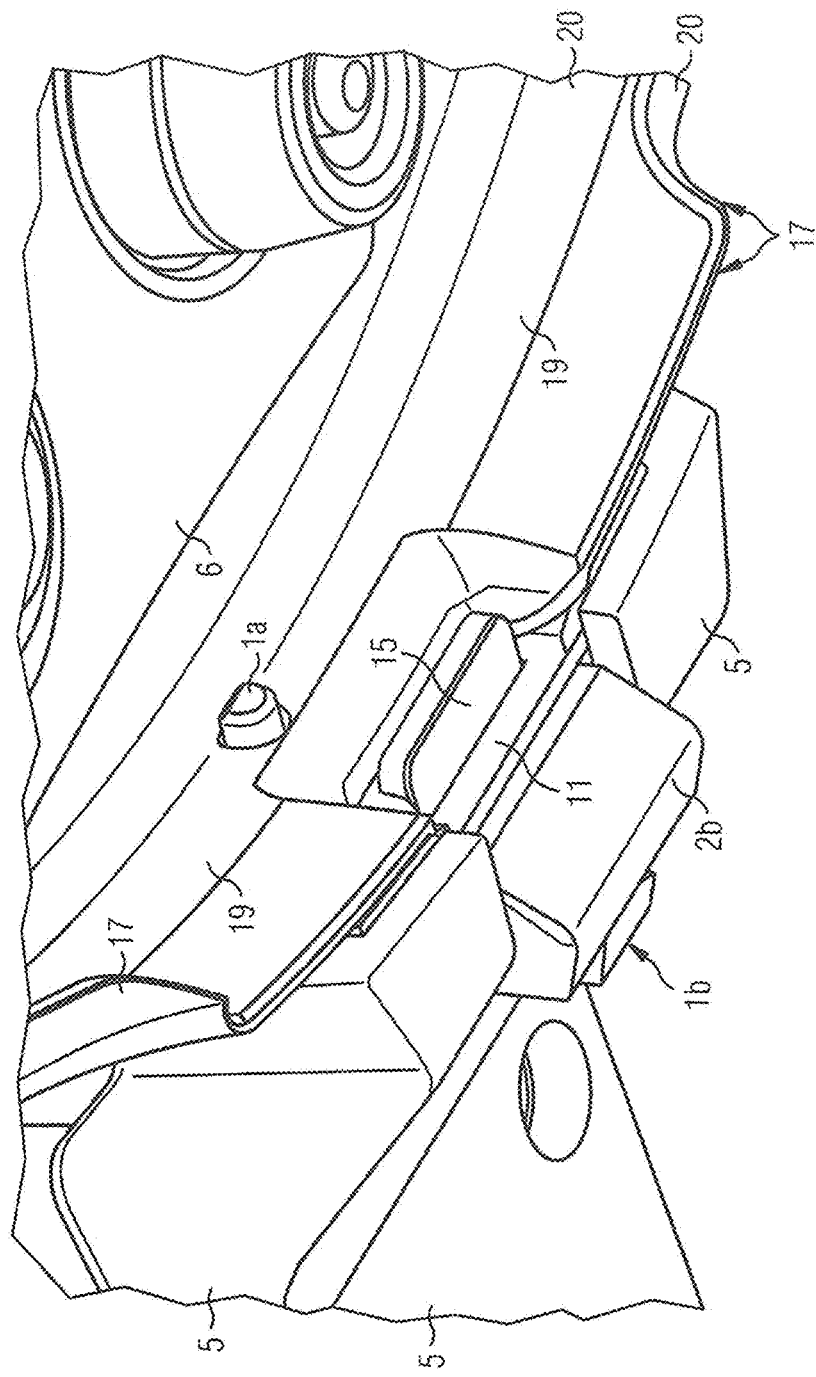
FIGS. 4 and 5 show additional views of the first embodiment.
Figure 5:
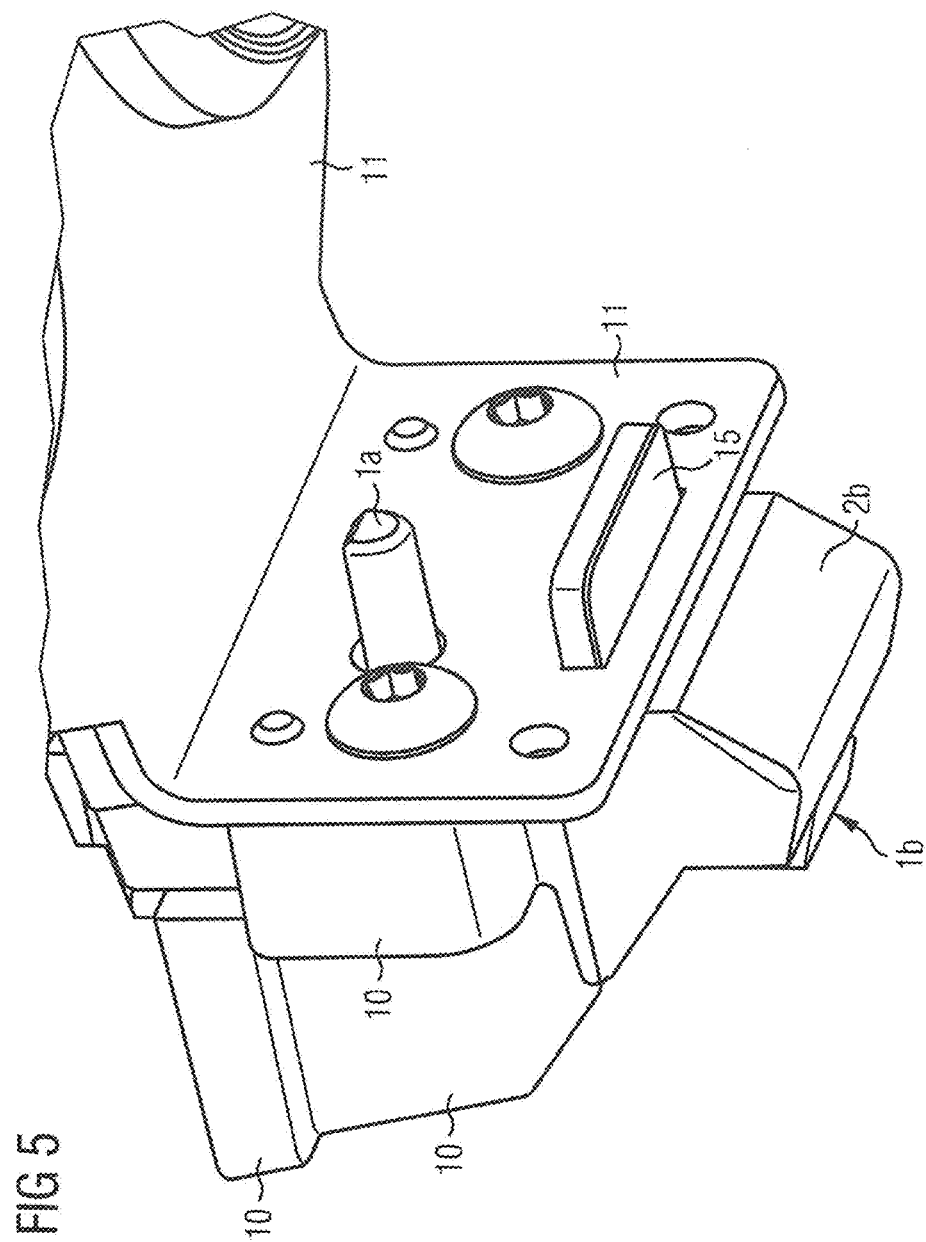

FIGS. 4 and 5 show other views of the first embodiment, which are advantageous for the understanding of the structure thereof and the operating method thereof.

FIG. 6 shows another variant according to the invention (second embodiment) which functions in a quite similar manner to the first embodiment or the first variant so that only the differences are described below.

The coupling device comprises in this second variant, instead of a control cam, which branches from a common control cam portion 4 into two branches 4a and 4b (FIG. 2), in this instance a single control cam which does not branch but which instead has the (when viewed in the peripheral direction of the pot, that is to say, tangentially with respect to the pot edge) three different portions 4'a, 4'b and 4'c (there is consequently precisely one single control cam 4').

The coupling elements 1, 2 (not shown) of the coupling group are constructed in such a manner that, for fluid-tight closure of the cooking vessel with the lid (not shown in FIG. 6), they are not mechanically uncoupled from each other as in the first embodiment, but instead are mechanically coupled to each other. The coupling group is constructed in such a manner that the two coupling elements 1, 2 are kept apart from each other by means of a pressure spring (not shown but quite similar to in FIG. 1) (state uncoupled from each other), wherein the elements 1, 2 are introduced with this spacing when the handle 5 is turned relative to the handle 3 in the direction toward the position placed one above the other in the state uncoupled from each other (cf. dashed arrows in FIG. 6) into the first control cam portion 4'a of the cam 4'.

In the direction toward the position placed one above the other, this portion 4'a tapers toward the portion 4'b and this portion 4'b ultimately opens in the portion 4'c. When viewed in the direction radially toward the pot outer side, the portion 4'c has a smaller extent than the portion 4'a. The portion 4'c in this instance extends over approximately half the extent of the portion 4'a. This changed extent or width over the three control cam portions is achieved by there being formed at both sides of the tapering control cam 4' two wall portions 14'a and 14'b of a U-shaped wall 14' which assume in this second variant a similar function to the wedge 14 in the first embodiment. However, with the difference that the two wall portions 14'a and 14'b merge in the direction toward the control cam portion 4'c. The control cam 4' which extends between these two wall portions 14'a and 14'b as a guiding recess therefore tapers in the direction toward the base of the U-shaped wall 14' (that is to say, in the portion 4'c) to the maximum extent.

When the two handles 3, 5 are rotated one above the other into their mutually aligned position (position located one above the other), the two coupling elements 1, 2 or the bearings 1b, 2b thereof (not shown but quite similar to the first embodiment) are consequently pressed together counter to the force of the pressure spring 8, whereby the two elements 1, 2 are in the position 4'c in the mechanically coupled-together state. Since the inner side of the first position 4'a when viewed radially is closer to the pot center axis than the inner side of the portion 4'c, in a quite similar manner to in the first embodiment, the bolt 1a is retracted (details not shown here) so that in the position 4'c the sealing ring 7 is applied and the pressure cooker is consequently closed in a pressure-tight manner.

The invention claimed is:

1. A pressure cooker comprising:
   a lid comprising a lid handle; and
   a cooking vessel comprising a vessel handle, wherein the cooking vessel is closeable with the lid in a fluid-tight manner by means of a closure mechanism by the lid handle and the vessel handle being placed one above the other,
   wherein one of the two handles comprises a coupling group which has two coupling elements configured to couple mechanically to each other and to uncouple mechanically from each other again,
   wherein the other of the two handles comprises a coupling device which is constructed for said coupling together and/or for said uncoupling in such a manner that, when the lid handle and the vessel handle are placed one above the other, the two coupling elements are either mechanically uncoupled from each other by means of the coupling device or mechanically coupled to each other, wherein said fluid-tight closure of the cooking vessel with the lid is brought about by means of the closure mechanism, and
   wherein the coupling device has a partition element and two control cam branches which are separated from each other by the partition element in such a manner that, when the lid handle and the vessel handle are placed one above the other, the two coupling elements are mechanically uncoupled from each other by the partition element and separately from each other guided mechanically into the two control cam branches.

2. The pressure cooker of claim 1, wherein for mechanically uncoupling from each other or for mechanically coupling to each other, the two coupling elements when viewed relative to each other can be moved by means of the coupling device along a straight line.

3. The pressure cooker of claim 1, wherein the coupling group comprises as a first coupling element a bolt element and as a second coupling element a sliding element, wherein the two coupling elements can be moved relative to each other by means of the coupling device.

4. The pressure cooker of claim 1, wherein the handle that has the coupling group has at least one housing element by means of which the two coupling elements are supported or can be supported in a mechanically tensioned manner with respect to each other.

5. The pressure cooker of claim 1, wherein said mechanical mutual uncoupling or mutual coupling of the two coupling elements by means of the coupling device when the lid handle and the vessel handle are placed one above the other brings about an application of a sealing element of the closure mechanism on the lid, whereby in turn said fluid-tight closure of the cooking vessel with the lid is brought about by means of the closure mechanism.

6. The pressure cooker of claim 1, wherein one of the two coupling elements of the coupling group comprises a spacer which during mechanical uncoupling or mutual coupling is moved relative to the lid, in particular when viewed from the lid center axis away from the axis in such a manner that said application of the sealing element on the lid is carried out.

7. The pressure cooker of claim 1, wherein one of the two coupling elements of the coupling group has an abutment, wherein in the coupled-together state of the two coupling elements the abutment is mechanically supported on the other of the two coupling elements.

8. The pressure cooker of claim 7, wherein the same one of the two coupling elements has both the spacer and the abutment, wherein the spacer at least in the coupled-together state of the two coupling elements, where applicable also in the mutually uncoupled state of the two coupling elements, at the side opposite the abutment protrudes beyond the other of the two coupling elements.

9. The pressure cooker of claim 6, wherein the spacer is an elongate member.

10. The pressure cooker of claim 1, wherein the lid handle is removably secured to the lid.

11. The pressure cooker of claim 10, wherein the lid handle comprises the coupling group and in that the second coupling element thereof is constructed in such a manner that, when viewed from the lid center axis, it can be moved away from the axis with the first coupling element of the coupling group being carried mechanically in order to enable the lid handle to be removed from the lid.

12. The pressure cooker of claim 4, wherein the handle that has the coupling group has two housing elements between which the two coupling elements are supported or can be supported in a mechanically tensioned manner with respect to each other.

13. The pressure cooker of claim 4, wherein the handle that has the coupling group has two housing elements between which the two coupling elements are supported or supportable in a pretensioned manner with respect to each other by means of a pressure spring.

14. The pressure cooker of claim 4, wherein the handle that has the coupling group has two housing elements between which the two coupling elements are supported or can be supported in a pretensioned manner with respect to each other by means of two pressure springs.

15. The pressure cooker of claim 7, wherein in the coupled-together state of the two coupling elements, the abutment is mechanically supported on the other of the two coupling elements on a counter-bearing of this other coupling element.

16. A pressure cooker comprising:

a lid comprising a lid handle; and a cooking vessel comprising a vessel handle, wherein the cooking vessel is closeable with the lid in a fluid-tight manner by means of a closure mechanism by the lid handle and the vessel handle being placed one above the other, wherein one of the two handles comprises a coupling group which has two coupling elements configured to couple mechanically to each other and to uncouple mechanically from each other again, wherein the other of the two handles comprises a coupling device which is constructed for said coupling together and/or for said uncoupling in such a manner that, when the lid handle and the vessel handle are placed one above the other, the two coupling elements are either mechanically uncoupled from each other by means of the coupling device or mechanically coupled to each other, wherein said fluid-tight closure of the cooking vessel with the lid is brought about by means of the closure mechanism, wherein the handle that has the coupling group has two housing elements between which the two coupling elements are supported or can be supported in a pretensioned manner with respect to each other by means of two pressure springs.

* * * * *